J. T. HUNTER & D. L. H. MITCHELL.
Plows.
No. 136,245.  Patented Feb. 25, 1873.
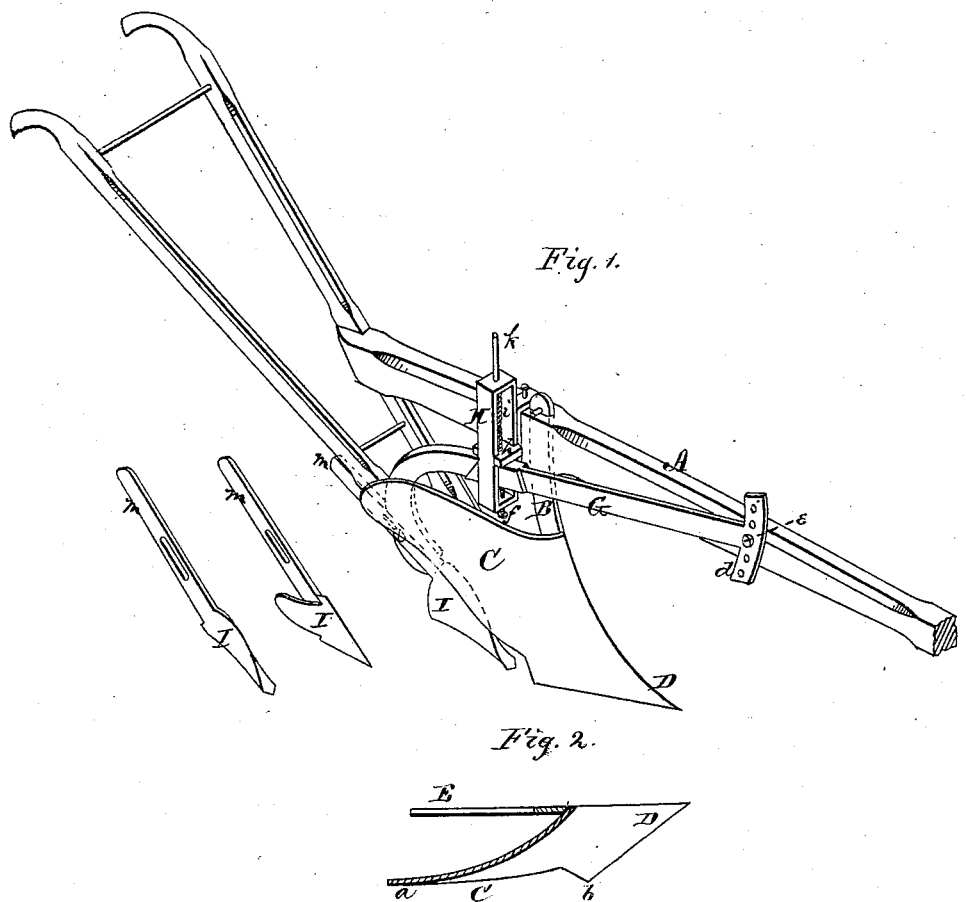

UNITED STATES PATENT OFFICE.

JOHN T. HUNTER AND DANIEL L. H. MITCHELL, OF FOREST, MISSISSIPPI.

IMPROVEMENT IN PLOWS.

Specification forming part of Letters Patent No. 136,245, dated February 25, 1873.

*To all whom it may concern:*

Be it known that we, J. T. HUNTER and D. L. H. MITCHELL, of Forest, in the county of Scott and in the State of Mississippi, have invented certain new and useful Improvements in Plow with Subsoil Attachment; and do hereby declare that the following is a full, clear, and exact description thereof, reference being had to the accompanying drawing and to the letters of reference marked thereon, making a part of this specification.

The nature of our invention consists in the construction and arrangement of a subsoil attachment for plows, as will be hereinafter more fully set forth.

In order to enable others skilled in the art to which our invention appertains to make and use the same we will now proceed to describe its construction and operation, referring to the annexed drawing, in which—

Figure 1 is a perspective view of the entire plow with the subsoil attachment thereto, and Fig. 2 is a plan view of the plow proper.

A represents the plow-beam with a mortise through which the standard B passes. C represents the mold-board; D, the share; and E, the land-side bar—all connected with or to the standard B. The mold-board C is of an oval or rounding shape, making its outer surface convex, which renders it impossible for the dirt to clog or stick to it. By this shape of the mold-board it will not throw the dirt forward, but will pass the dirt off at the rear of the mold-board, and turn the same bottom side up, thereby making the draft much lighter than one intended to throw the dirt forward. The bottom part or throttle of the plow is perfectly open, which prevents the dirt from sticking to it underneath, thereby saving the time and labor required to clean it out, and also making the draft much lighter.

It will be noticed that it is the same distance from the heel *a* of the mold-board to the bar E as it is from the rear point *b* of the cutting spear or share to said bar, which causes the plow to cut a furrow its own width, and allows the bottom part of the mold-board to run in the furrow the share cuts.

Our subsoil attachment is constructed in the following manner: G represents a curved beam, the front end of which is provided with a scroll or segment, *d*, perforated, as shown, and attached by means of a screw, *e*, through either of said perforations into the plow-beam. The beam G passes through a rectangular collar or loop, H, attached to the plow-beam, and rests upon a set-screw, *f*, which passes upward through the lower end of said collar or loop. On top of the beam G, in the collar H, is a follower, *h*, from which a stem passes up through the top of the collar; and this stem is within the collar, surrounded by a spiral spring, *i*, which presses the follower down upon the beam G. In the lower end of the beam G is a diagonal dovetailed groove for the insertion of the shank *m* of the subsoiler I, which shank is slotted and adjusted in said groove at any height desired, and fastened by a screw. The subsoiler I may be of either of the forms shown in Fig. 1, as may be desired, for the work intended to be done.

With this subsoil attachment the weight or draft is on the plow-beam and near the horse, thereby giving it more strength, being almost impossible to break it; other attachments, being attached to the beam between the handles or at the foot, being liable to break or cause the beam to break at the mortise.

By means of the scroll or segment on the front end the point of the subsoiler may be raised or lowered at will.

By means of the collar, spring-follower, and set-screw the subsoiler can be set to any depth desired. At the same time it does not interfere with the guiding or control of the plow to which it may be attached, for in the forward motion of the plow the pressure is thrown on the set-screw at the bottom of the collar; and, by means of the spring on the follower-stem, it will give or yield, so as to give free control of the front plow.

Having thus fully described our invention, what we claim as new, and desire to secure by Letters Patent, is—

1. The combination of the beam G with the collar H and its spring-follower, as and for the purpose set forth.

2. The combination of the adjustable beam G, collar H, and the set-screw $f$ for regulating the beam, all substantially as set forth.

3. The combination of the beam G, with diagonal dovetailed groove in one side, with the subsoiler I provided with a slotted shank, $m$, which is passed into said groove and held by a set-screw, all substantially as set forth.

In testimony that we claim the foregoing we have hereunto set our hands this 27th day of December, 1872.

JOHN T. HUNTER.
DANIEL L. H. MITCHELL.

Witnesses:
J. H. GRUNDY,
JOHN F. WARD.